Sept. 20, 1971  W. K. WYATT ET AL  3,606,120
CONTINUOUS BAND WIDTH CONTROLLER AND BAND DIRECTOR
Filed June 23, 1969  4 Sheets-Sheet 1

INVENTORS.
William Kirk Wyatt
John R. Brownell
BY Paul & Paul
ATTORNEYS.

INVENTORS.
William Kirk Wyatt
John R. Brownell

BY Paul + Paul
ATTORNEYS.

Sept. 20, 1971      W. K. WYATT ET AL      3,606,120

CONTINUOUS BAND WIDTH CONTROLLER AND BAND DIRECTOR

Filed June 23, 1969      4 Sheets-Sheet 4

INVENTOR.
William Kirk Wyatt
BY   John R. Brownell

Paul + Paul
ATTORNEYS.

United States Patent Office 3,606,120
Patented Sept. 20, 1971

3,606,120
CONTINUOUS BAND WIDTH CONTROLLER AND BAND DIRECTOR
William Kirk Wyatt, Lansdale, and John R. Brownell, Telford, Pa., assignors to Turbo Machine Company, Lansdale, Pa.
Filed June 23, 1969, Ser. No. 835,614
Int. Cl. B65h 25/08
U.S. Cl. 226—22
10 Claims

ABSTRACT OF THE DISCLOSURE

A control means for the adjustment of the band width of a moving band of continuous material and for directing the traverse of the band as it passes over a plurality of tensioning bars; the band being subject to deviations in its width and its lateral position due to its inherent properties in such an environment. The means comprises at least one bar presenting a curved surface to one face of the band, said surface, upon engaging said face, causing said band to spread or become narrower in accordance with the disposition of said curved surface, and a bar contacting the face of the band of material and capable of being tilted with respect to the dominant moving plane of said face by means disposed at the end of said bar, and most preferably by means connected to said bar within the range of its contact with said face to pivot said bar about a point removed from the axis thereof. Both bars are actuated by amplifier-controller servo systems which are constantly error sensitive.

BACKGROUND OF THE INVENTION

This invention relates to servomechanisms, and more particularly to a servomechanism for use in controlling the band width and the lateral position of a moving band of continuous material.

Textile materials, such as tow, are commonly processed in apparatus wherein the tow is drawn from the bag or barrel and fed through a plurality of bars to apply tension to the tow and to present it to a processing apparatus in the form of a moving band. In order to process this band properly, it is often necessary to maintain the band in a particular lateral position with a band width as near to uniform as possible.

SUMMARY OF THE INVENTION

The present invention provides an apparatus for adjusting the band width and lateral position of a moving band of continuous material such as filamentary tow. It comprises a means for spreading or narrowing the tow, or other similar material, in combination with a means for impressing a controlled tension gradient across said tow, and most preferably, in combination with a means for shifting the entire band laterally.

The means for spreading or narrowing the tow comprises one or more bars which are pivotally mounted to rock toward or away from at least one face of the band of material, and which have curved surfaces for engaging the band. In the most preferred embodiment of this invention there are two bars provided on a common pivotally mounted frame; one of which presents a convex surface to a face of the band and the other of which presents a concave surface to a face of the band. In response to appropriate input signals obtained from sensing means downstream of the frame, the frame is pivoted so as to bring one or the other or both bars into greater or lesser contact with the faces of the band. The concave bar tends to compress the band together producing a smaller band width. The convex bar tends to spread the material producing a wider band. The sensing means continuously measures the degree of error from a desired norm in the band width, and the frame is pivoted in response thereto so that the band width is constantly adjusted.

The means for adjusting the lateral position of the band comprises a means for impressing a controlled tension gradient across the moving band of material, which includes at least one pivotally mounted bar, preferably being pivoted at a point within the range of contact with the band and spaced from the axis of the bar. The bar is constantly in contact with the moving face of the band of material and is most preferably a straight cylindrical bar. In response to appropriate input signals obtained from sensing means downstream of the bar, the bar is pivoted and thereby applies a greater or lesser tension across the moving band. The band tends to traverse laterally on the bar as it continues to move longitudinally. In alternate embodiments the inclination of the bar can be adjusted by means disposed at one or both ends of the bar.

In the preferred embodiments of the invention the bar is pivoted about a point spaced from its axis so that the entire band is displaced laterally instantaneously thereby providing a step function in the servo system. A sensing means continuously measures the degree of error in the position of the band from a desired norm, and the bar is pivoted in responsse thereto so that the position of the band is constantly monitored and adjusted as needed.

The combination of the width adjusting and the position adjusting means is particularly effective when the means are in close proximity with one another in the apparatus and when the sensors are closely positioned to each other and the correction devices so that sensing and correction are interrelated.

Accordingly it is an object of this invention to provide a servomechanism for controlling the band width and lateral position of a moving band of continuous material.

This and other objects will become apparent from the following description with reference to the accompanying drawings.

DESCRIPTION OF THE PREFERRED EMBODIMENTS

Figure 1:
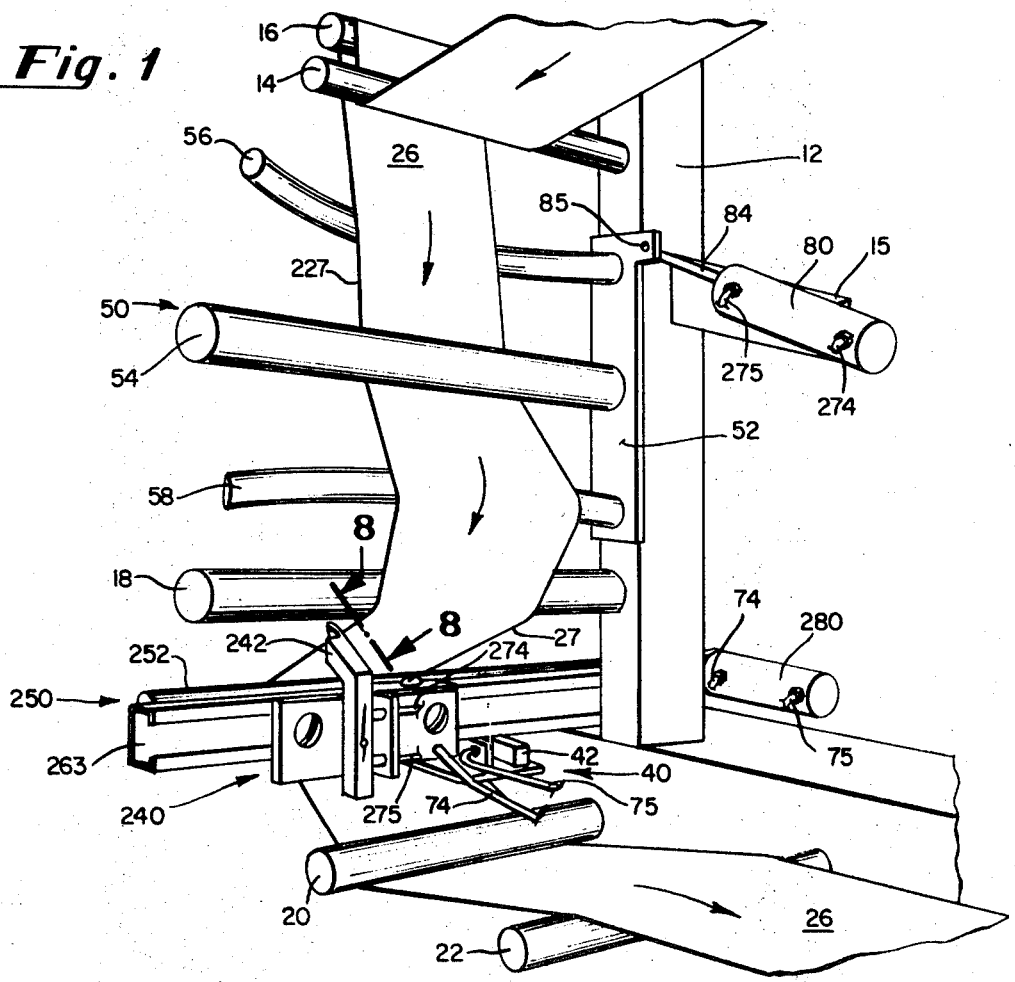
FIG. 1 is a perspective view of a portion of an apparatus for handling a moving band of material showing the most preferred embodiment of the invention, partially broken away for clarity and in operative relation to a band of material in the apparatus.

Although specific forms of the invention have been selected for illustration in the drawings, and the following description is drawn in specific terms for the purpose of describing these forms of the invention, this description is not intended to limit the scope of the invention which is defined in the appended claims.

Referring to the figures, FIG. 1 shows a portion of the apparatus which is the part of a larger machine (not shown in detail) such as a stapler for processing a continuous band of textile material. In the case of a stapler, the textile material treated is tow which is removed from a barrel (not shown) and drawn over and under a plurality of guide bars which serve to both guide and tension the tow slightly prior to the time it is fed into the working mechanism of the stapler. As the tow approaches the stapler portion of the machine, the guide bars become closer and closer together and the tension increases from a slight tension caused by the weight of the tow band hanging between relatively widely spaced apart guide bars, to a firmer tension imparted by wrapping the tow around relatively closely spaced tensioning bars and drawing it over the bars. The tow tends to wander on the bars transversely to the direction in which it is being drawn and the band, which is made of a plurality of continuous filaments, tends to vary in its band width. This invention is concerned with the problem of simultaneously controlling the band width and the lateral position of the band.

As shown in FIG. 1 the apparatus comprises a frame 12 having mounted to it a plurality of fixed guide bars 14, 16, 18, 20 and 22 about which the band of tow 26 is drawn in a tortuous path in the direction indicated by the arrows. The effect of this arrangement is to tension the band and to guide it.

Figure 5:
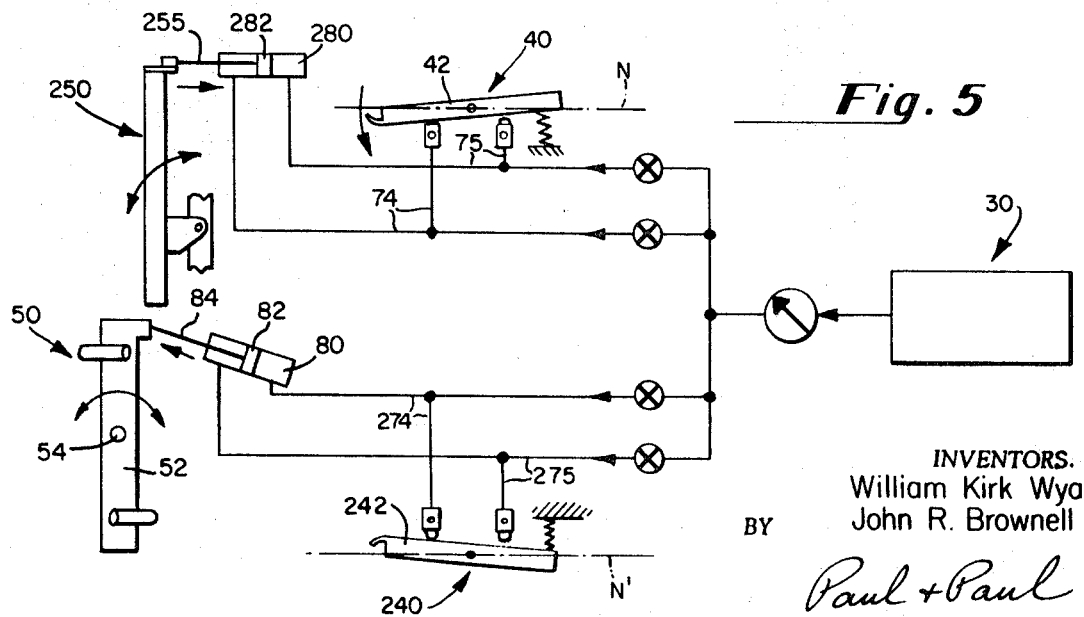
FIG. 5 is a schematic diagram of the servo system for the embodiment shown in FIGS. 1 thru 4.

To control the position and width of the band a servo system represented schematically in FIG. 5 is provided comprising a power source designated generally 30, error sensing means 40 and 240, and controllers designated generally 50 and 250. The system shown is a pneumatic system, but it will be understood that the controls could by hydraulic, electric, electromechanical, or other well known means. The system represented is a closed loop type of controller in that error between the state desired and the state existing is constantly measured and if there is error sensed something is done about it. As previously stated, the error which we are concerned with in this application is deviation in band width and lateral position. Thus the band width may be wider or narrower than the desired norm at a given point and/or the right or left edge of the band may have to be positioned within certain desired limits in order that the band be properly accepted downstream of the control point for further processing, or perhaps it would be desirable to center the band within a given range.

Sensors, which are most preferably spaced closely together, but not necessarily on the same side of the band, are provided at the point at which error is to be sensed. We have found that by placing the sensors in close proximity to the controllers, which are making the corrections in response to the errors detected by the sensors, the entire system functions to produce a more accurate and quickly responsive correction in the band than has heretofore been known in the art.

FIG. 1 shows both the controllers and the sensors in operative relation to the band. In this, the preferred embodiment, we have found it most desirable to place the centering or lateral displacement control 250 downstream of the width controller 50. Further we have placed the sensor 40 for the lateral displacement controller downstream of both controllers, while the sensor 240 for the width controller is disposed between the controllers.

Referring to FIGS. 1 through 6, the band width controller 50 comprises a frame 52 which is pivotally mounted in any suitable fashion to the frame 12, as by means of the straight shaft 54, which is fixedly connected to the frame 52 and passes therethrough and is journaled in bearings (not shown) in the frame 12. The axis of the shaft 54 is parallel to the axes of the guide shafts 14, 16, 18, 20 and 22. The shaft 54 is always in contact with a face of the band 26.

In the preferred embodiment, two control bars are provided to change the width of the band. These control bars can be more easily referred to by the disposition of their curvatures with respect to the faces of the tow band 26. Thus, control bar 56 can be referred to as a concave control bar and control bar 58 can be referred to as a convex control bar.

In the figures both the convex and concave control bars are engaged with the band 26. Thus, the band is first narrowed by the concave bar and then is broadened by the convex bar, prior to reaching the sensor 42. This position is purely arbitrary and is depicted solely for the purposes of illustrating the function of the control bars. The concave surface of bar 56 tends to narrow the band width as the band runs across the bar under tension between the guide bar 16 and the shaft 54. The convex surface of control bar 58 tends to spread the band as it passes over the bar 58 under tension between the shaft 54 and the guide bar 18. These bars are interchangeable in their relative positions with respect to the line of travel of the band. Thus when handling very narrow material it is desirable to purposely keep the band wider than the desired width by using the spreader bar 58 upstream of the narrowing control bar 56, thus allowing the narrowing bar to act as the ultimate control to reduce the band width to that desired just as it passes the control point.

It will be apparent that various other adjustments or changes in the mechanism could be made by those skilled in the art. For example, it is possible to separately mount the bars on separate pivoted frames, or to run the material over the concave bar only, keeping the convex bar out of engagement in the normal condition and bringing it into engagement only when necessary, or to reverse this procedure and place the convex bar normally in engagement with the band, while maintaining the concave bar spaced from the face of the tow band and bringing it into engagement only when necessary. However, by mounting both bars in the same pivotally mounted frame and maintaining both in contact with the band, the optimum degree of control of the width of the band can be achieved.

Figure 7:
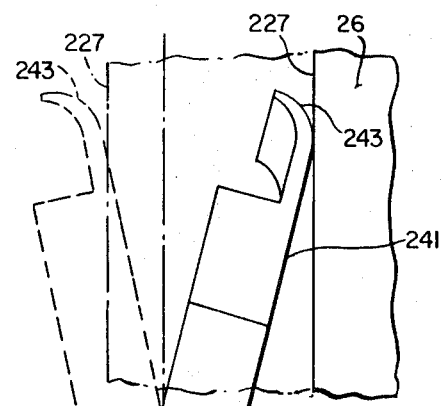
FIG. 7 is an enlarged elevation of the portion of the apparatus shown in FIGS. 1 and 2, partially broken away, with alternate positions shown in phantom.

By sensing the position of one tensioned edge of the band in close proximity to the control means, the band width can be accurately controlled. To accomplish this, a sensor 242, shown in greater detail in FIG. 7, is normally spring biased by the spring 244 to rotate in a clockwise direction about a shaft 246 passing therethrough. The shaft 246 is affixed to the frame 248 which is mounted in any suitable fashion in the apparatus, as by bolting the member 263 which is fixedly attached to the frame 12. The sensor 242 is so positioned that its feeler end 243 lies against the edge 227 FIGS. 1 and 7 of the band 26. The sensor is preferably on the order of ½ inch wide and curved outwardly away from the band so as not to snag on the edge 227 of the band. Spring biasing by the spring 244 is sufficient to keep the sensor in contact with the edge 227 as the band traverses laterally, as illustrated by the phantom positions, FIG. 7.

Any error sensed by the sensor 242 is transmitted through the servo system to the controller 50 which is moved in order to make a correction. Referring particularly to FIGS. 5 and 7, the sensor 242 is in a position wherein the band width is narrower than the optimum desired at the sensing point. Thus the sensor has rotated clockwise slightly from the normal line designated N'. The normal line is a line through the pivot point or axis of the shaft 246 which would normally be parallel to the edge 241 of the sensor 242 when that edge lies in the same plane as, and in engagement with, edge 227 of the band 26. In this position no signal is generated and this is the optimum normal position in which the band width is to be considered constant. In this regard that the band should be centered within acceptable limits at the measuring point and means are provided for accomplishing this centering, which will be described in greater detail hereinafter.

In the normal position the edge 241 is spaced from the surfaces of the two valve plungers 270 and 272. Each valve is spring biased open by the springs 271 and 273 respectively, so that air passing through the lines 274 and 275 respectively will exit through the bleed holes 276 and 277 respectively. The lines 274 and 275 are continuously pressurized from a source of controlled pressure 30 shown in FIG. 5. These lines are connected to the ends of a pneumatic cylinder 80 which is attached to the frame 12.

It is desirable that the cylinder be mounted so as to be able to pivot and for this purpose a track 13 is provided on the arm 15 extending from the frame 12. A shaft 17 extends from the side of the cylinder through the track 13 and is journaled in a bearing on its outer end which is retained in fixed position against the arm 15 by any suitable means, such as nut 19, FIG. 3, so that the cylinder is free to pivot about the shaft 7 and yet is retained against the arm 15.

Figure 4:
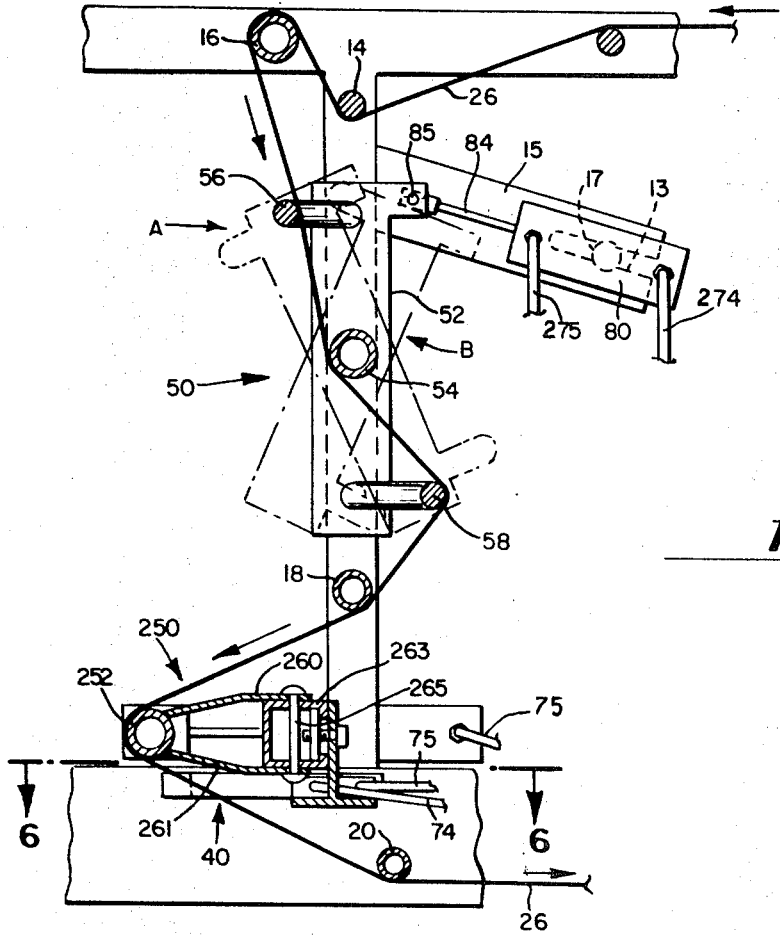
FIG. 4 is a view taken as indicated by lines and arrows 4—4 in FIG. 3, showing the band with alternate positions shown in phantom.

Within the cylinder, there is a piston 82, FIG. 5, having a piston rod 84 extending through a suitable seal at the end of the cylinder, said rod being pivotally connected as by pin 85, FIGS. 1 and 4, to the frame 52. Thus when the piston 82 is moved axially within the cylinder 80, the piston rod 84 causes pivotal movement of the frame 52 about the axis of the shaft 54.

In the normal position the pressure is equal in lines 274 and 275 and the pressure on either side of the piston 82 in the cylinder 80 is equal. Consequently the frame 52 is maintained in a fixed position. When the band 26 is narrowed as shown in the full view in FIG. 7, the end 243 of sensor 242 follows the edge 227 of the band 26 and sensor 242 is rotated clockwise. As it rotates, it first takes up the gap between the edge 241 and the plunger 270, and then depresses the valve plunger 270 and closes the bleed hole 276. This causes pressure to build up in the line 274 and consequently the pressure behind the piston 82 in the cylinder 80 is greater than that ahead of the piston and in line 275. Thus the piston will be forced to the left when viewed as in FIG. 5, and the rod 84 will move to the left causing the frame 52 to pivot in a counterclockwise direction about the axis of the shaft 54. The frame 52 would then assume the position shown in phantom designated A in FIG. 4. Thus the concave or narrowing control bar 56 will be removed from engagement with the band 26 and the band will pass freely from control rod 16 across shaft 54. Furthermore, the convex or broadening control bar 58 will be displaced so as to put a greater tension on the band and spread it even further. Thus the band will be widened as it passes under the bar 18 and the bar 20.

As the band gets wider the edge 227 forces the sensor 242 to rotate counterclockwise toward its normal position. When it is once again in its normal position, both vent holes are open and the pressure on either side of the piston is the same. The piston will then remain in this position until a further error is sensed.

If the band should get wider than desired, the sensor would move to the position shown in phantom in FIG. 7 causing the valve plunger 272 to close the vent hole 277 and increase the pressure in the line 275 thereby forcing the piston to the right and rotating the frame 52 in a clockwise direction. This would have the effect of reducing the contact which the control bar 58 has with the face of the band and increasing the contact which the control bar 56 has with the face of the band as shown by the phantom position designated B in FIG. 4. Thus the band would be narrowed and the sensor would return to its normal position.

Figure 8:
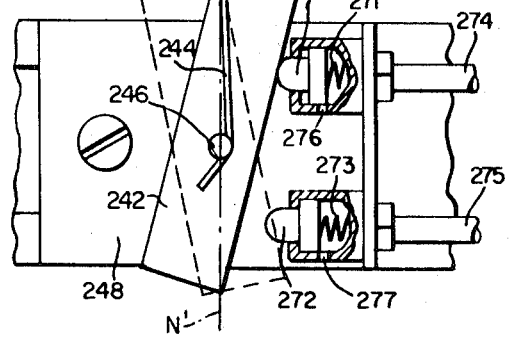
FIG. 8 is a view taken as indicated by lines and arrows 8—8 in FIG. 1.

As shown in FIG. 8 the sensor 242 is preferably disposed to overlie the upper face of the band 26. This is accomplished by mounting the sensor at an angle as shown. In this matter the edge 227 will be turned slightly downwardly as it passes the sensor, but will resume its normal orientation in the band as it passed over the next bar 252. This feature of the invention effectively prevents the edge from being rolled or folded upon itself.

Referring to FIGS. 1 thru 6, the band director 250 comprises a bar 252 which is preferably a straight cylindrical piece of polished steel connected at one end to a bracket 253 which is pivotally connected as at 254 to a movable piston rod 255. In the most preferred embodiment the bar 252 is supported to pivot about a point removed from the axis thereof. The support means includes a yoke comprising the support members 260 and 261, FIG. 4, which are welded or otherwise suitably affixed to the bar 252 and which embrace the support frame 263 which is fixedly attached to the frame 12 by any suitable means. The yoke is retained for pivotal movement with respect to the support frame 263 by means of the pin 265 which passes through both of the members 260 and 261 and the frame 263 and is peened over at both ends in the matter of a rivet.

The bar 252 is normally in contact with the entire face of the moving band 26. By tilting the bar, that is, by changing the angle of inclination of the bar with respect to the surface of the moving band (as shown by the phantom positions C and D in FIG. 3) it is possible to vary the tension in the moving band. This variation can be expressed as a gradient across the band. This tension gradient causes the band to travel from a region of high tension to a region of lower tension as it continues to run in a longitudinal direction over the bar 252. If the bar was simply supported at one or the other or even both ends, so as to pivot about one end the sole function of the pivoting of the bar would be to cause a migration of the band transverse to its longitudinal direction of travel. However, by pivoting the bar at a point intermediate the ends thereof at a distance removed from the axis thereof, the entire band is shifted transversely immediately upon pivotal movement of the bar. Thus there is provided an instantaneous change in position or what is known as a step function in the migratory rate. This instantaneous reaction greatly improves the ability of the device to respond to deviations from the norm and quickly make suitable corrections.

Figure 6:
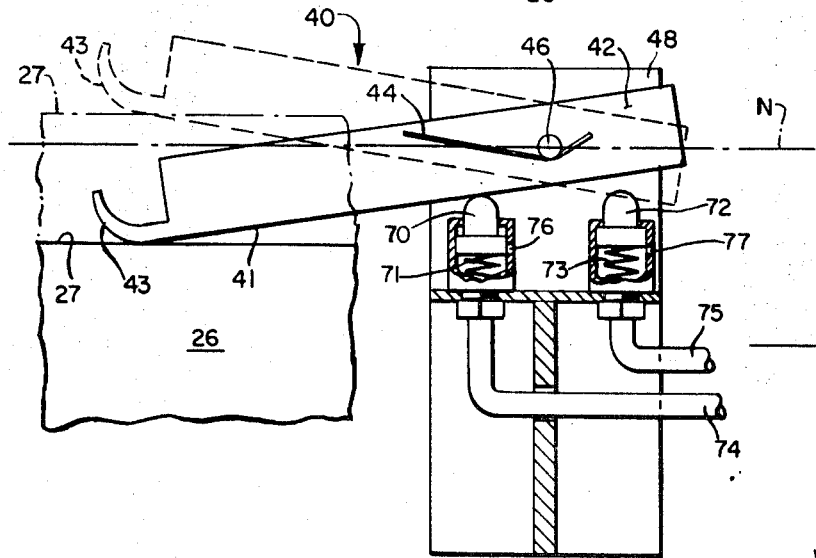
FIG. 6 is a view taken as indicated by lines and arrows 6—6 in FIG. 4 with alternate positions shown in phantom.

A sensing mechanism along one tensioned edge of the band in close proximity to the control means measures the deviation from the norm. The sensor 42, shown in greater detail in FIG. 6, is a bar mounted for pivotal movement about a pin or shaft 46 and spring biased by the spring 44 to engage the edge 27 of the band 26. The shaft 46 is affixed to the frame 48 which is mounted in any suitable fashion in the apparatus as by welding to the frame 12. The sensor 42 is so positioned that the lead end 43 lies in the same plane as and against the edge 27 of the band 26. The sensor is preferably on the order of ½ inch wide and curved outwardly away from the band so as not to snag on the edge 27 of the band. Spring biasing by the spring 44 is sufficient to keep the sensor in contact with the edge 27 as the band traverses laterally as illustrated by the phantom position in FIG. 6.

Any error sensed by the sensor 42 is transmitted through the servo system to the controller 250 which is moved in order to make a correction. The sensor 42 FIG. 6 is in a position wherein the band has moved to the left when viewed as in FIG. 1 a greater distance than the optimum desired at the sensing point. Thus the sensor has moved counterclockwise when viewed as in FIG. 6 (see schematic FIG. 5) slightly from the normal line designated N (see FIGS. 5 and 6). The normal line is a line through the pivot point or axis of the shaft 46 which would normally be parallel to the edge 41 of the sensor 42 when that edge lies in engagement with edge 27 of the band 26 and the band is running in its normal position. In this position no signal is generated and this is the optimum normal position in which the band is not laterally traversing in the apparatus.

In the normal position, the edge 41 is spaced from the surfaces of the two valve plungers 70 and 72. Each valve is spring biased open by the springs 71 and 73 respectively, so that air passing through the lines 74 and 75 respectively will exit through the bleed holes 76 and 77 respectively. Lines 74 and 75 are continuously pressurized from a source of pressure 30 shown in FIG. 5. These lines are connected to the ends of a pneumatic cylinder 280 which is attached to the frame 12.

It is desirable that the cylinder be mounted so as to be able to pivot and for this purpose a bearing block 213 is provided, fixedly attached to the frame by any suitable means (not shown), in which there is journaled a swivel-type bearing 215 which is connected to an extension 217 of the frame of cylinder 280. The bearing is retained on the extension 217 by means of the spacer element 219 and the nut 221 threaded thereon.

Within the cylinder 280 there is a piston 282 having a piston rod 255 extending through a suitable seal at the end of the cylinder and through the members 215, 217, 219, and 221. When the piston 282 is moved axially within the cylinder 280 the piston rod 255 causes pivotal movement of the bar 252 and also pivots the cylinder within the bearing 215.

In the normal position the pressure is equal in the lines 74 and 75 and the pressure on each side of the piston 282 in the cylinder 280 is equal. Consequently the bar 252 is maintained in a fixed position. When the band 26 has wandered to a position beyond acceptable limits (as shown in the full view in FIG. 6), the end 43 of the sensor 42 follows the edge 27 of the band and the sensor 42 is rotated counterclockwise. As it is rotated, it first takes up the gap between the edge 41 and the plunger 70, and then depresses the valve plunger 70 and closes the bleed hole 76. This causes pressure to build up in the line 74 and consequently the pressure ahead of the piston 282 in the cylinder 280 is greater than that behind the piston in the line 75. Thus the piston will be forced to the right when viewed as in FIG. 5 and the rod 255 will move to the right when viewed as in FIG. 3, causing the bar 252 to pivot in a clockwise direction (when viewed from above) about the axis of the pin 265. The bar 252 would then assume a position similar to that shown in phantom designated C in FIG. 3.

Thus the tension gradient across the band will be changed and the tension will decrease from a region of relatively higher tension at the free end, to a region of relatively lower tension at the end of the bar nearest the piston, thereby causing the band to migrate toward the latter end with time. Further the rate of migration is not the only factor which causes the band to be shifted transversely. As previously stated, the step function provided by the pivot mechanism causes an instant response in that the band is instantly shifted as a whole transversely to the direction in which it is being drawn.

As the band shifts, the edge 27 forces the sensor 42 to rotate clockwise toward its normal position. When it is once again in its normal position both vent holes 76 and 77 are open and the pressure on both sides of the piston 282 is the same. The piston will then remain in this position until a further error is sensed.

Figure 3:
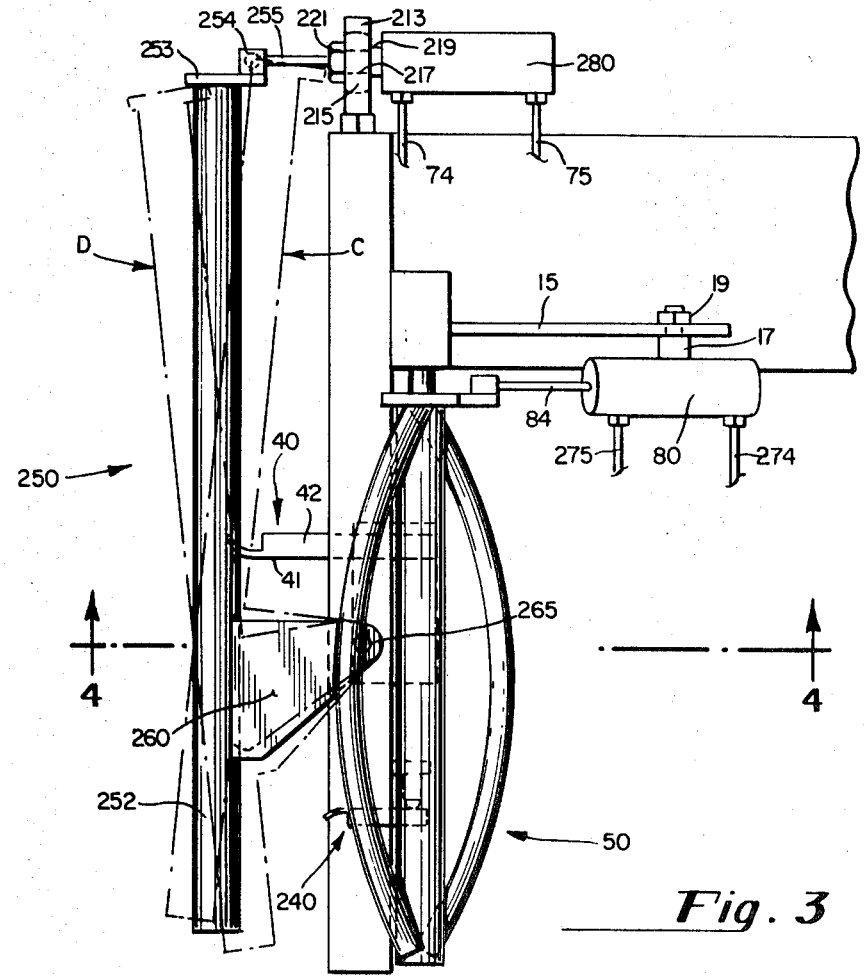
FIG. 3 is a plan view of the apparatus shown in FIGS. 1 and 2 with the material removed for the sake of clarity and with alternate positions shown in phantom.

If the band should move into the position shown in phantom in FIG. 6 causing the valve plunger 72 to close the vent hole 77 and increase the pressure in the line 75, then the piston would be forced to the left and the bar 252 would be rotated counterclockwise when viewed as in FIG. 3. This would have the effect of changing the tension gradient across the face of the band and also shifting the band in its entirety to the left when viewed as in FIG. 1 (the control bar 252 assuming the phantom position designated D in FIG. 3). As the band once again returns to its normal position, the vent holes are opened and the pressure on both sides of the piston is equalized, so that the piston remains in position until a further error is sensed.

OPERATION OF THE PREFERRED EMBODIMENT

In operation assume that the band gets wider from the right side only (when viewed as in FIG. 1). The directional controller 250 will quickly shift the band to align its right edge. The effect of this shift will be felt principally downstream, as the upstream portion of the band essentially remains uncontrolled. However, there will be some effect immediately upstream of the bar 252. The entire error in width will be transferred to the left side and will be immediately sensed by the sensor 242 of the width controller 50. The width controller will respond by trying to correct the entire error by binging both sides of the band in, that is by narrowing the band from both sides simultaneously. However, the given input or upstream error was entirely on the right side, therefore the band 26 would be off center to the right as it passed over the bar 56, that is, the edge 27 would already extend further out along the curvature of the bar 56 from the center, than the edge 227. Thus the correction in band width would be felt to the greatest extent initially on the right edge 27. This is so even though to some extent the directional controller 250 has the effect of causing the band to migrate to the left, even on its upstream side. The overall effect then is to cause the band to pull in from the right side 27 more than from the left side 227. Since the given width error on side 27 was already corrected by the initial correction of the controller 250, there will now be a further error sensed by the sensor 42 which will read the latest movement of the edge 27 as being a shift of the band to the left. Accordingly, it will make the necessary correction to move it to the right. This again will cause a reaction at the sensor 242.

The hunting just described is most pronounced when highly sensitive sensors are used. However, when sensors of the type described are used, the spacing between the faces 41 and 241 of the sensors and the valve plungers to an extent determines the sensitivity of the device. Thus if the faces were constantly in contact with the valve plungers, the range or permissible deviation in band width or position would be very narrow, since response to pivotal movement of the sensor would be almost instantaneous. However, when a gap or space is left between the faces and the valve plungers (as previously described), a permissible deviation range is provided whereby the band width or position can vary within acceptable limits without any correction being made by the apparatus.

It is obvious then that a certain amount of hunting will be involved in making these corrections. However, by placing the sensors and controllers in close proximity as shown in the most preferred embodiment in FIG. 1, and by having a directional controller with a response mechanism that provides a step function in the controlled rate, the hunting is reduced to a mere fluttering. In those cases where the error is not sufficient to cause movement of the valve plungers, and where the error is within the acceptable norm or range, there will be no hunting at all.

Figure 2:
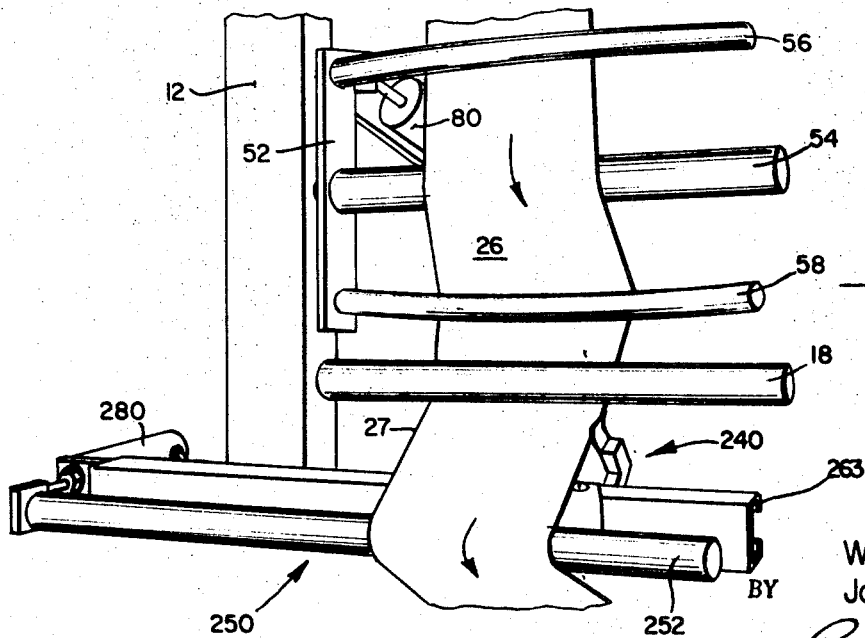
FIG. 2 is a perspective view of the apparatus shown in FIG. 1 taken from the opposite side.

Further note that a correction made by the bar 252 in FIG. 2 will automatically pull the band along the lowermost curved bar of the width controller 50. This will immediately begin to make a correction since the band is always over center. This correction will be felt downstream and by the time it gets to the sensors will result in somewhat less of an error than the full error attributable to the initial shift of the band. Accordingly, there is inherently a cyclical dampening of the error to practical extinction.

ALTERNATE EMBODIMENTS

Figure 10:
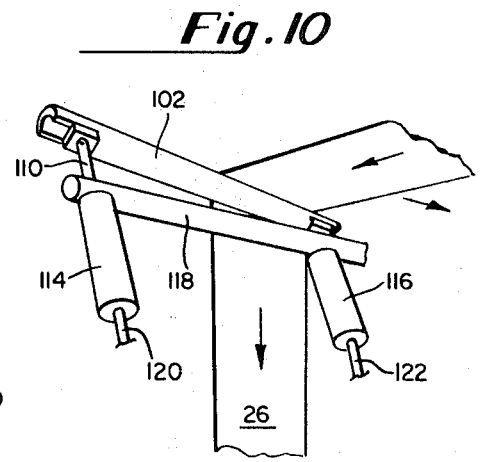
FIG. 10 is a perspective view of a portion of the apparatus shown in FIG. 9, with the parts disposed in an alternate position.
Figure 9:
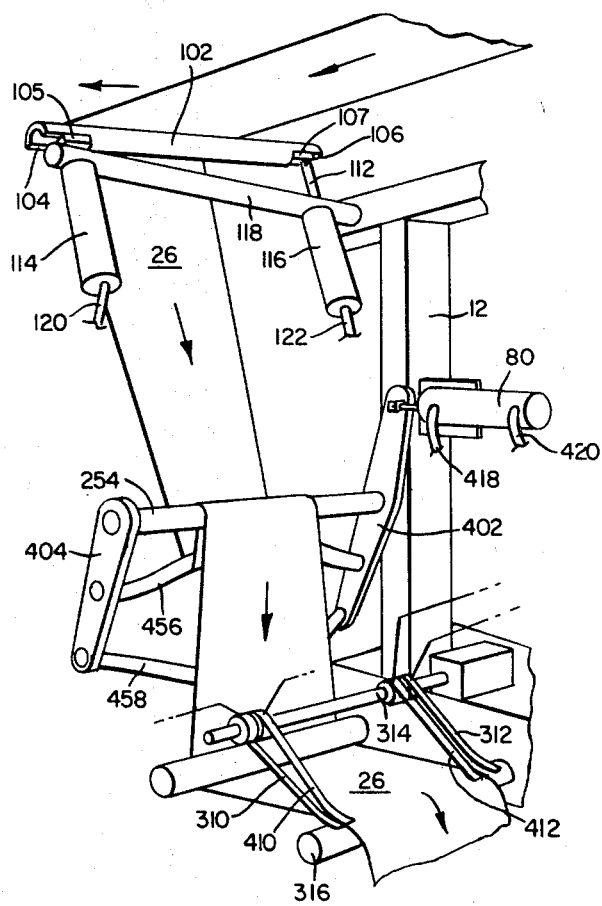
FIG. 9 is a perspective view of an alternate embodiment of the invention.

FIGS. 9 and 10 show an alternate embodiment of this invention in which a plurality of sensors are used and in which the band width is strongly permanently biased in one direction while being controlled in the other direction, and in which the directional control bar is supported at both ends and can be pivoted by either or both support means in response to signals generated by a plurality of sensing elements in the control system.

In this embodiment a modified control bar 102 is provided which is relieved at both ends, as at 104, 106, to accommodate fixedly attached blocks 105, 107 respectively. The blocks serve as a base means for pivotally attaching (in any suitable manner, as by pins) the piston rods 110, 112 to the ends of the control bar 102. Each rod is actuated by a cylinder 114, 116 respectively, which cylinders are mounted in bearings similar to the bearings 215 in the previous embodiment, said bearings being retained in the frame member 118 which is fixedly attached to the frame 12 as by welding. The cylinders depicted are single acting, that is, the position of the piston and piston rod in the cylinder is determined by the pressure exerted against the bar 102 on the one hand and the back pressure behind the piston in the cylinder (which is supplied by a pneumatic source through the lines 120 and 122), on the other hand.

A pair of feelers or sensors 310 and 312 are mounted on and insulated from a rod 314 which is fixedly connected to the frame 12 in any suitable manner so as to extend across the band 26. These feelers are preferably made of spring steel or similar material and are spring biased to lay against the band or to come in contact with the metal bar 316 over which the band is being drawn, if a band is not disposed between them and the bar. The bar 316 and feelers 310 and 312 are connected by means of an electrical circuit (not shown) in which each feeler can coact with the bar 316 as a switch. The electrical circuit controls the air pressure in the lines 120, 122 to the air cylinders 114 and 116 by any suitable means such as a three-way solenoid actuated valve (not shown) and thus controls the positioning of the piston rods 110 and 112.

The system shown is a make or break system in that the control bar 102 responds to an on-off sensing means in the form of the electrical switches previously discussed. Thus the impulse signals to the pistons are either on or off and the rods are either fully raised or fully lowered. Where, as here, a plurality of feelers are used, both edges of the band are sensed. The band normally runs in the space between the two sensors 310 and 312 and the sensors normally contact the bar 316 to close their circuits. If it runs wide or shifts to one side or the other between a sensor and the bar 316, a circuit would be opened and an appropriate air input signal would be sent to one cylinder or the other in order to change the angle of inclination of the bar 102 with respect to the face of the band 26.

This will change the migration of the band as it continuously moves over the bar 102. Where the pistons are independently controlled, both sides may be raised or both sides may be lowered or one side or the other may be raised while the opposite side is lowered. In comparing FIG. 9 with FIG. 10, note that when the right end of the bar 102 is raised and the left end is lowered the band tends to shift to the left (as shown by the arrow FIG. 9), while when the left end is raised and the right end is lowered, as in FIG. 10, the band tends to shift to the right.

This directional controller represents a rate device wherein the migration of the band is controlled by the tension gradient. There is no provision for shifting the band as by way of the step function described in the previous embodiment.

In this embodiment a modified frame 402 is provided wherein the shaft 254 is fixedly connected to the frame 402 and is mounted in bearings in the frame 12. However, the outwardly disposed end of the shaft 254 is interconnected by means of member 404 with the outwardly disposed ends of the shafts 456 and 458. The member 404 increases the fixed stability of the shafts with respect to one another and allows the shaft 456 to bear a greater load. Further, while the frame 402 pivots about the axis of the shaft 254 as in the previous embodiment, both control shafts are disposed to the same side of the pivot shaft, rather than on opposite sides thereof. Here in the web 26 is always drawn across the narrowing concave control arm 456 and then across the shaft 254. Thus the band 26 is constantly narrowed. The pneumatic piston and cylinder 80 is the same as that previously described and is connected to the frame 402 to pivot it about the axis of the shaft 254. Upon appropriate movement, the broadening control arm 458 is brought into contact with the face of the band 26 to spread the band. Thus the upper bar is constantly trying to converge the tow to a minimum width, whereas the lower bar 458 intermitently contacts the tow in order to widen it out again.

A pair of feelers or sensors 410 and 412 are mounted on and insulated from the rod 314. The feelers 410 and 412 are preferably made of spring steel or similar material and are spring biased to lay against the band or to come in contact with the metal bar 316 if a band is not disposed between it and the bar. The bar 316 and the feelers 410 and 412 are connected by means of an electrical circuit (not shown) in which each feeler can coact with the bar 316 as a switch. The electrical circuit controls the air pressure in the lines 418 and 420 to the air cylinder 80 by any suitable means, such as a three-way solenoid actuated valve (not shown) and thus controls the positioning of the piston 82 within the cylinder.

The system shown is also a make or break system in that the control bar 456 is constantly condensing the material flowing past it and it is only when this material contracts beyond a predetermined acceptable limit that any change is made in the position of frame 402. In the normal condition, the bar 456 constantly narrows the band 26 and the bar 458 either widens the band to a desired limit or does not engage the band at all. Should the band become too narrow and slip from its position between either or both of the feelers 410 and 412 and the bar 316, the feelers would make a circuit to cause movement of the frame 402 in a counterclockwise direction about the shaft 254. This movement brings the convex bar 458 into engagement with the band 26. As the band widens it will eventually run between the feelers and bar 316 thereby breaking the circuit and allowing the frame to return to its original position.

It will be apparent to those skilled in the art that various changes in the functions performed by the switches 310–316, 312–316, 410–316 and 412–316 could be made in order to vary the reactions on the frame 402 or bar 102. Further additional feelers and circuits could be used to obtain results similar to those previously described. For example, the switch 412–316 could be used to widen the band while the switch 410–316 could be used to rock the frame 402 in a clockwise direction about the axes of the shaft 254 and thereby disengage the convex control bar 458 from the face of the band 26 and allow the concave control bar 456 to once again narrow the band. Additional modifications could be made within the scope of this invention, as for instance, by providing another set of feelers spaced parenthetically from the sets of feelers, to set an outer limit for the width of the band.

By placing the control frame 402 as far upstream as practicable from the point in which the tow is to be delivered at an aceptable band width, it is possible to minimize the effects of any small deviations in band width. It is also apparent that the width control bars can be reversed or placed in any desirable position.

It is desirable to have the centering device or apparatus in this embodiment placed upstream ahead of the band width control device because the width control will give more accurate results when the band is centered and width sensors are used on both sides of the band.

The principle shown in this alternate embodiment of having sensors along both edges of the band can be applied to the preferred embodiment by those skilled in the art within the principle and scope of this invention.

It will be understood that various other changes in the details, materials, arrangements and parts which have been herein described and illustrated in order to explain the nature of this invention may be made by those skilled in the art within the principle and scope of the invention as expressed in the claims. In particular the type of sensors whether electrical, mechanical or otherwise can be varied. The position and number of the sensors can be varied as where a single sensor is used on the left side or the right side or a plurality of sensors are used on both sides. The mode of operation of the piston and cylinder arrangements can also be varied as where double acting cylinders are used in the embodiment shown in FIGS. 9 and 10 in accordance with the operation discussed with respect to the first eight figures. Additional sets of contacts or sensors may be used in order to perform additional functions, such as turning off the machine in case the band becomes too wide.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

What is claimed is:

1. In an apparatus for handling a moving band of continuous material passing over a plurality of bars, the improvement comprising:
    (a) width control means mounted in said apparatus for producing a controlled change in the width of said band by engaging at least one face thereof; said width control means comprising:
        (1) a frame pivotally mounted in said apparatus;
        (2) a plurality of bars extending from said frame to pivot therewith, comprising at least one bar having a convex curve with respect to a face of said moving band and at least one bar having a concave curve with respect to a face of said moving band; and
        (3) means engaging said frame and coacting with said sensing means for pivoting said frame and bringing the curved portion of at least one of said curved bars into contact with said band;
    (b) director means in said apparatus for impressing a tension gradient across said band; and
    (c) sensing means for monitoring the width of said band and for monitoring the lateral position of said band, said sensing means coacting with said width control means and said director means to make controlled changes in the width and lateral position of said band within predetermined ranges.

2. The invention of claim 1 wherein said bars mounted on said frame comprise at least one substantially straight bar disposed between said convex and said concave bars in the path of travel of said band.

3. The invention of claim 2 wherein said convex and concave bars are on opposite sides of the pivot point of the frame.

4. The invention of claim 2 wherein the ends of at least some of said bars remote from said frame are fixedly connected to one another.

5. The invention of claim 1 wherein said sensing means comprises at least one sensor located downstream of said width control means and said director means, and at least one sensor located between said width control means and said director means.

6. The invention of claim 1 wherein said director means comprises a bar pivotally mounted in said apparatus to contact a face of said band and being tiltable with respect thereto, said bar being pivotally mounted at both ends and separate means being provided connected to said pivotal mountings, each of said separate means being capable of moving said bar against said band, and a servo-mechanism connected to said bar to tilt it about its pivots in response to deviations in the position of said band within a predetermined range sensed by said sensing means.

7. The invention of claim 6 wherein said separate means includes pivotally mounted single acting pneumatic cylinders having pistons therein with piston rods extending through the ends thereof pivotally connected to said bar, and a plurality of sensing means for engaging said band to monitor deviations in the lateral position thereof within predetermined ranges, and fluid pressure means connected to said cylinders and said sensing means responsive to said sensing means to move said pistons.

8. The invention of claim 2 wherein at least one curved bar and said substantially straight bar are maintained in continuous contact with said band, and said means engaging said frame is responsive to said sensor means for bringing the curved portion of said other curved bar into contact with said band.

9. The invention of claim 8 wherein said concave bar is maintained in continuous contact with said band.

10. In an apparatus for handling a moving band of continuous material passing over a plurality of bars, the improvement comprising:
    (a) width control means mounted in said apparatus for producing a controlled change in the width of said band by engaging at least one face thereof;
    (b) director means in said apparatus for impressing a tension gradient across said band; and
    (c) sensing means for monitoring the width of said band and for monitoring the lateral position of said band, comprising at least one sensor located downstream of said width control means and said director means, and at least one sensor located between said width control means and said director means, said sensing means coacting with said width control means and said director means to make controlled changes in the width and lateral position of said band within predetermined ranges.

References Cited
UNITED STATES PATENTS 3,171,579   3/1965   Robertson _____ 226—23

FOREIGN PATENTS 525,230   5/1956   Canada _____ 226—22

ALLEN N. KNOWLES, Primary Examiner

U.S. Cl. X.R.

226—195